United States Patent
Lim et al.

(10) Patent No.: US 8,503,438 B2
(45) Date of Patent: Aug. 6, 2013

(54) METHOD AND SYSTEM FOR SELECTIVELY BYPASSING PACKET CORE NETWORK WITHIN A SESSION BASED ON TRAFFIC TYPE

(75) Inventors: Heeseon Lim, Cupertino, CA (US);
Nishi Kant, Fremont, CA (US)

(73) Assignee: Stoke, Inc., Santa Clara, CA (US)

( * ) Notice: Subject to any disclaimer, the term of this patent is extended or adjusted under 35 U.S.C. 154(b) by 294 days.

(21) Appl. No.: 12/949,624

(22) Filed: Nov. 18, 2010

(65) Prior Publication Data

US 2011/0116499 A1    May 19, 2011

Related U.S. Application Data

(60) Provisional application No. 61/262,871, filed on Nov. 19, 2009.

(51) Int. Cl.
  *H04L 12/66* (2006.01)
(52) U.S. Cl.
  USPC .......... 370/355; 370/335; 370/401; 370/328; 370/349; 455/436; 455/444; 455/432.1; 455/432.2
(58) Field of Classification Search
  USPC .............................. 370/230.1–231, 350–356
  See application file for complete search history.

(56) References Cited

U.S. PATENT DOCUMENTS

| | | | |
|---|---|---|---|
| 7,167,447 B2 * | 1/2007 | Puuskari et al. | 370/231 |
| 7,321,587 B2 * | 1/2008 | Gao et al. | 370/388 |
| 7,532,613 B1 * | 5/2009 | Sen et al. | 370/352 |
| 7,664,074 B2 * | 2/2010 | Kim et al. | 370/331 |
| 7,680,109 B2 * | 3/2010 | Lundin et al. | 370/390 |
| 2003/0174689 A1 * | 9/2003 | Fujino | 370/349 |
| 2003/0185178 A1 * | 10/2003 | Chitrapu et al. | 370/335 |
| 2004/0136324 A1 * | 7/2004 | Steinberg et al. | 370/238 |
| 2006/0258356 A1 * | 11/2006 | Maxwell et al. | 455/436 |
| 2006/0268835 A1 * | 11/2006 | Hyotylainen et al. | 370/352 |
| 2006/0268836 A1 * | 11/2006 | Prentice | 370/352 |
| 2007/0268855 A1 * | 11/2007 | Grayson et al. | 370/328 |
| 2008/0207170 A1 * | 8/2008 | Khetawat et al. | 455/411 |
| 2010/0027533 A1 | 2/2010 | Kant et al. | |
| 2010/0246532 A1 * | 9/2010 | Olvera-Hernandez et al. | 370/331 |
| 2011/0007632 A1 * | 1/2011 | Turanyi et al. | 370/235 |
| 2011/0075557 A1 * | 3/2011 | Chowdhury et al. | 370/230 |

FOREIGN PATENT DOCUMENTS

WO   WO 2010/017233 A1   2/2010

OTHER PUBLICATIONS

PCT International Search Report for corresponding PCT Patent Application No. PCT/US2010/057439, Feb. 9, 2011, 5 pgs.
PCT Written Opinion of the International Searching Authority for corresponding PCT Patent Application No. PCT/US2010/057439, Feb. 9, 2011, 8 pgs.
"Stoke Mobile Data Offload Solution Brief", Aug. 2009, 4 pgs, Stoke, Inc.
Prior Art Publishing GmbH, "Generic Policy Control for Local Breakout", Nov. 17, 2009, 12 pgs.

* cited by examiner

*Primary Examiner* — Asad Nawaz
*Assistant Examiner* — Berhanu Belete
(74) *Attorney, Agent, or Firm* — Blakely, Sokoloff, Taylor & Zafman LLP (57) ABSTRACT

According to one aspect of the invention, packets of a first type within a first data flow are routed to a destination through a packet core network. In response to a detection that packets of a second type are to be routed while routing the first data flow, a second data flow is created which is a sub-flow of the first data flow. Packets of the second type are routed via the second data flow to the destination without traversing the packet core network, while packets of the first type are routed via the first data flow traversing the packet core network.

12 Claims, 6 Drawing Sheets

METHOD AND SYSTEM FOR SELECTIVELY BYPASSING PACKET CORE NETWORK WITHIN A SESSION BASED ON TRAFFIC TYPE

RELATED APPLICATIONS

This application claims the priority of U.S. Provisional Patent Application Ser. No. 61/262,871, filed Nov. 19, 2009, which is incorporated by reference herein in its entirety.

FIELD OF THE INVENTION

The present invention relates generally to packet networks. More particularly, this invention relates to a method for selectively bypassing a packet core network within a session based on the traffic type.

BACKGROUND

Figure 1:
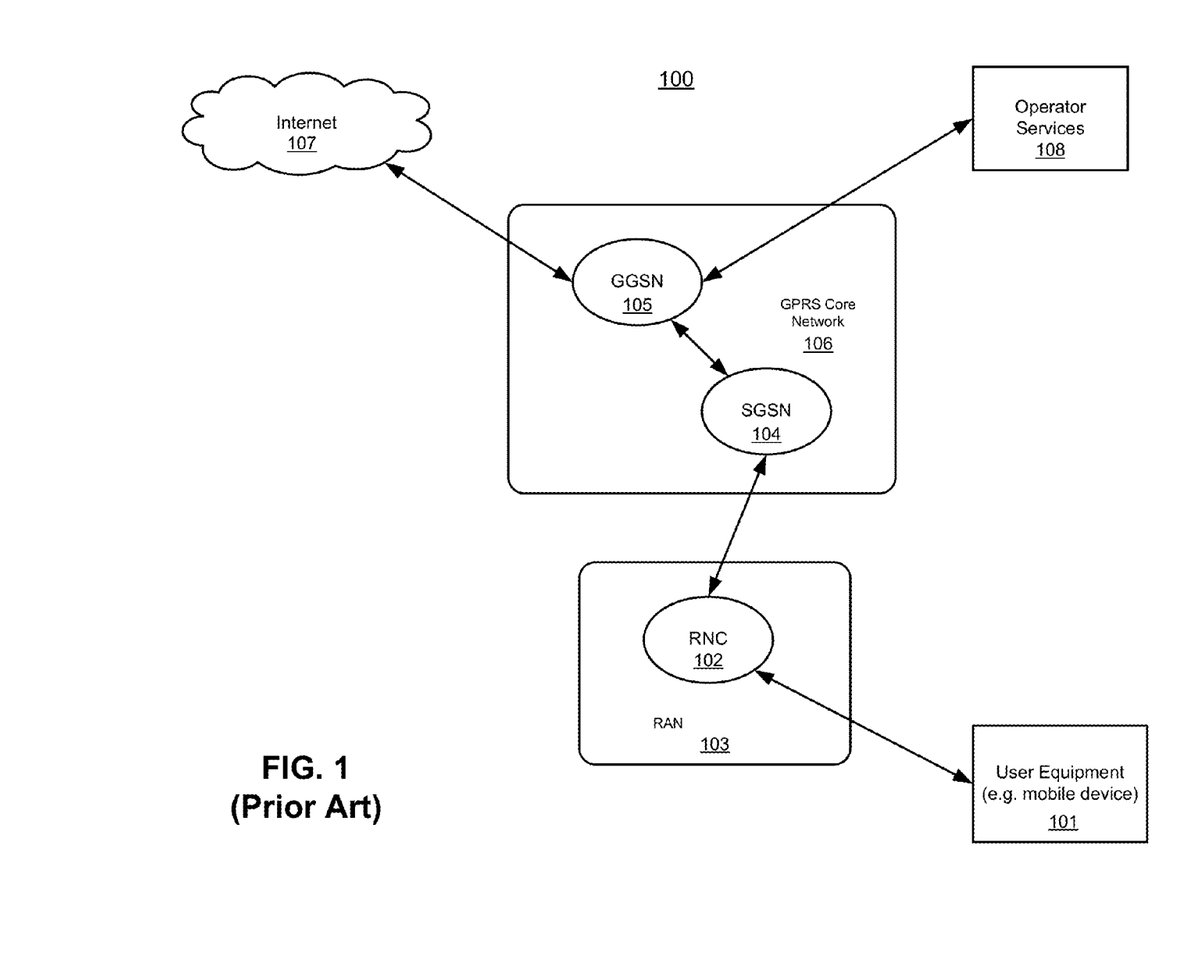
FIG. 1 is a block diagram illustrating typical 3GPP packet network architecture.

The general packet radio services/universal mobile telecommunications system (GPRS/UMTS) is an evolution of the global system for mobile communications (GSM) standard to provide packet switched data services to GSM mobile stations. Packet-switched data services are used for transmitting chunks of data or for data transfers of an intermittent or bursty nature. Typical applications for third generation partnership project (3GPP) packet service include Internet browsing, wireless e-mail, and credit card processing, etc. FIG. 1 is a block diagram illustrating typical 3GPP packet architecture. Referring to FIG. 1, user equipment (UE) 101 is communicatively coupled to a radio network controller (RNC) 102 of a radio access network (RAN) 103. In order to access other networks such as Internet 107 and/or operator services node 108, UE 101 has to go through 3GPP packet core network 106. Typically, 3GPP packet core network 106 includes a serving GPRS support node (SGSN) 104 and a gateway GPRS support node (GGSN) 105. The support node SGSN and gateway node GGSN relay communications between a user terminal (or source mobile station) and a destination.

Note that typically, there will be multiple SGSNs associated with a GGSN, multiple RNCs associated with a SGSN, and multiple UEs associated with an RNC in a hierarchical structure (not shown). Thus, when traffic from the UEs increases, the traffic imposed on higher level nodes (e.g., SGSN and/or GGSN) in the hierarchical structure will be exponentially increased. Based on an analysis of mobile broadband data traffic patterns, a majority of traffic from UEs is Internet bound traffic, which does not benefit from session anchoring in a traditional mobile packet core. Making the Internet bound traffic traverse the SGSN and GGSN uses SGSN/GGSN resources and will add unnecessary delays to the Internet traffic. With the increase in mobile broadband traffic, the built-in hierarchy in the existing architecture results in more investment in SGSNs, GGSNs, and the transmission network from a RAN to a core network without exploiting the nomadic and Internet nature of traffic.

The decision to bypass the packet core network can be made when user first establishes the session with mobile network, as described in co-pending U.S. patent application Ser. No. 12/415,853, filed Mar. 31, 2009, which is incorporated by reference herein in its entirety. However, there are some situations where the initial user request was for the traffic requiring low bandwidth and the traffic is not offloaded, which goes through the packet core network. Subsequently when the session requests broadband traffic, such broadband traffic is still routed through the packet core network regardless the change of required bandwidth or other routing parameters.

SUMMARY OF THE DESCRIPTION

Techniques for bypassing a packet core network for Internet bound traffic via a secondary PDP context are described herein. According to one aspect of the invention, packets of a first type within a first data flow are routed to a destination through a packet core network. In response to a detection that packets of a second type are to be routed while routing the first data flow, a second data flow is created which is a sub-flow of the first data flow. Packets of the second type are routed via the second data flow to the destination without traversing the packet core network, while packets of the first type are routed via the first data flow traversing the packet core network.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention. Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments of the invention, a data offload device is configured to selectively offload certain types of network traffic within a single session. Particularly, a second flow (e.g., a secondary PDP context) with respect to a first flow (e.g., a primary PDP context) is utilized to selectively offload certain types of traffic from the first flow without having to go through (e.g., bypassing) certain components such as an SGSN and/or a GGSN of a packet core network (e.g., a 3GPP packet core network). The second flow is configured as a sub-flow to the first flow, which may share certain characteristics or parameters. In one embodiment, a mobile data offload (MDO) device (also referred to herein as an MDO gateway (MDO-GW) or Internet breakout device) is implemented and located near an Internet point of presence or any other convenient point based on operator's network topology. Although throughout this application the MDO-GW is described as being co-located with an RNC at an edge of a RAN, such an MDO-GW may also be located at other locations. Further, an MDO-GW may be integrated with an RNC or alternatively, an MDO-GW may be integrated with an SGSN. Throughout this application, a primary PDP context is utilized as an example of a first flow or primary flow and a secondary PDP context that is created from the primary PDP context is utilized as an example of a second flow or secondary flow. However, other configurations may also be applied herein.

In one embodiment, initially a primary PDP context (e.g., a first flow) in a session is established and utilized to route data between a UE and a destination via a packet core network, which may be any kind of packet networks. For the purpose of illustration, a 3GPP packet network is utilized as an example of a packet network; however, other types of packet networks may also be applied herein. During the primary PDP context session, at some points, it is detected that certain traffic of the session requires a different routing parameter (e.g., a quality of service or QoS parameter) than the earlier or existing traffic based on certain routing rules or categories. For example, earlier traffic may include packets of a first type that are mainly control packets (e.g., involved in operator services) or non-Internet bound data traffic, which typically are routed through the packet core network (e.g., SGSN and/or GGSN nodes). Subsequently, when packets of a second type (e.g., video streaming packets) are detected to be routed, such traffic may require higher bandwidth or Internet bound routing.

In response to such detection, a secondary PDP context (e.g., a second flow) is initiated and created from the primary PDP context to route such packets of the second type to the destination directly bypassing the packet core network. Thus, the secondary PDP context is spun off from the primary PDP context for the purpose of offloading a different type of traffic from the existing PDP context without going through the packet core network, while the original type of traffic is still routed via the primary PDP context traversing the packet core network. However, both the primary and secondary PDP contexts still belong to the same session, sharing certain parameters such as a PDP IP address and an access point name (APN), etc. When the primary PDP context is terminated, the secondary PDP context is also terminated.

Figure 2:
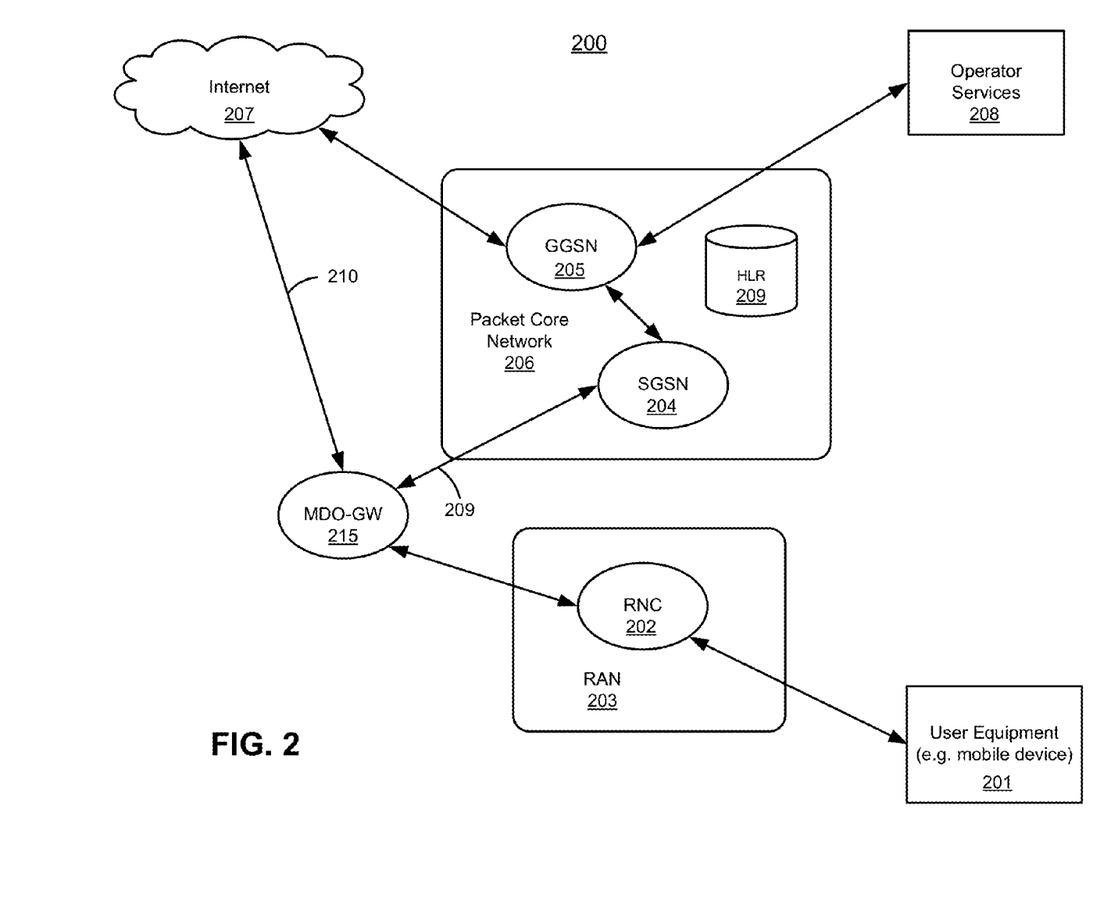
FIG. 2 is a block diagram illustrating a packet network system according to one embodiment.

FIG. 2 is a block diagram illustrating a 3GPP packet system according to one embodiment. Referring to FIG. 2, similar to FIG. 1, system 200 includes UE 201 communicatively coupled to RNC 202 of RAN 203. In a conventional system, in order to access other networks such as Internet 207 and/or operator services node 208, EU 201 has to go through 3GPP packet core network 206. Typically, 3GPP packet core network 206 includes serving GPRS support node (SGSN) 204, gateway GPRS support node (GGSN) 205, and home location register (HLR) 209. SGSN 204 and GGSN 205 have a function of relaying communications between a user terminal (or source mobile station) and a destination node (e.g. a server in the Internet or another mobile station). Note that again, there may be multiple SGSNs associated with a GGSN, multiple RNCs associated with a SGSN, and multiple UEs associated with an RNC in a hierarchical structure (not shown).

SGSN 204 effects data transmission between UE 201 and GGSN 205. For example, SGSN 204 collects up-link sessions from RNC 202 and distributes the down-link session delivered from GGSN 205 toward RNC 202. SGSN 204 manages a packet service between SGSN 204 and GGSN 205 by tunneling (e.g., GTP-GPRS Tunneling Protocol). SGSN 204 receives a subscriber profile stored in home location register (HLR) 209 and has therein at any time a copy thereof. The subscriber profile has information about the subscribed services (Internet, Operator Walled Garden Etc.)

GGSN 205 functions as a logical interface to an external data packet network such as Internet 107 and/or operator services node 208. GGSN 205 operates for coupling between core network 206 and such external packet data networks 107 and 208. More specifically, GGSN 205 collects up-link sessions from SGSN 204 and accesses Internet 107 and/or operator services 208. GGSN 205 in the 3GPP packet core network 206 sets up a tunnel down to SGSN 204 for down-link sessions.

HLR 209 is a database node for storing subscriber profiles including registered location information of the mobile stations, and delivers a copy of the subscriber data to the support node SGSN 204, upon request therefrom. More specifically, HLR 209 stores permanent subscriber data as to each of the mobile subscribers, such as including a mobile station integrated services digital network (ISDN) number (MSISDN) which specifies a proprietary mobile subscription by using a public switched telephone network (PSTN) numbering plan, and an international mobile subscriber identity (IMSI) which is a proprietary identity or identifier (ID) allocated to each subscriber and used for identification during the signal transmission in the mobile network system. HLR 209 also stores therein data including the current subscriber location corresponding to the address of VLR (visitor location register). For every mobile subscriber, it stores a list of the services that are allowed to the mobile subscriber.

In addition, according to one embodiment, an MDO-GW 215 is communicatively coupled to SGSN 204 of GPRS core network 206 and RNC 202 of RAN 203. For the purpose of illustration, in this example, MDO-GW 215 is implemented between SGSN 204 and RNC 203. However, MDO-GW 215 may also be located in other locations. In one embodiment, MDO-GW 215 is configured to interpret the control traffic flowing between UE/RNC and SGSN. Particularly, MDO-GW 215 is configured to examine the control traffic to determine whether UE 201 is attempting to establish a communication path with the Internet 207 or operator services 208.

If the traffic is for operator's services 208, both the control traffic and the associated data traffic are allowed to reach, via path 209, SGSN 204 for transfer to GGSN 205 in order to reach operator's services 208. In this scenario, the IP address (by which UE 201 is represented to the operator's services 208) is allocated by GGSN 205 and IP routers are configured to route all traffic destined to this IP address to GGSN 205 which in turn tunnels the data to UE 201 via SGSN 204 and RNC 202. Thus, MDO-GW 215 does not interfere with the control traffic that is exchanged between UE 201 and the 3GPP packet core network 206 for registering UE 201 with the network 206, as well as the mutual authentication between UE 201 and network 206. If it is determined that the traffic is destined for Internet 207, MDO-GW 215 directs the traffic to Internet 207 via path 210, bypassing SGSN 204 and/or GGSN 205 of 3GPP packet core network 206. Thus, only the Internet bound traffic will be diverted directly to the Internet 207, while the rest of the traffic will be allowed to enter 3GPP packet core network 206.

In one embodiment, initially a primary PDP context (e.g., a first flow or primary flow) in a session is established and utilized to route data between UE 201 and a destination via packet core network 206 (e.g., path 209). During the primary PDP context session, at some points, it is detected that certain traffic of the session requires a different routing parameter (e.g., a quality of service or QoS parameter) than the earlier or existing traffic based on certain routing rules or categories. For example, earlier traffic may include packets of a first type that are mainly control packets (e.g., involved in operator services) or non-Internet bound traffic, which typically are routed through the packet core network 206 (e.g., SGSN 204 and/or GGSN 205). Subsequently, when packets of a second type (e.g., an imminent flow of the second type such as video streaming packets) are detected to be routed, such traffic may require higher bandwidth or Internet bound routing. Such detection may be performed via a packet inspection and/or application layer signaling, etc.

In response to such detection, a secondary PDP context (e.g., a second flow or secondary flow) is initiated and created from the primary PDP context to route such packets of the second type to the destination (e.g., a node in Internet 207) bypassing packet core network 206 (e.g., directly or indirectly via path 210). Thus, the secondary PDP context is spun off from the primary PDP context for the purpose of offloading a different type of traffic from the existing PDP context without going through packet core network 206, while the original type of traffic is still routed via the primary PDP context traversing packet core network 206 via path 209. However, both the primary and secondary PDP contexts still belong to the same session, sharing certain parameters such as a PDP IP address and an access point name (APN), etc. When the primary PDP context is terminated, the secondary PDP context is also terminated.

In one embodiment, MDO device 215 is configured with a set of one or more rules (not shown) governing certain situations in which certain types of traffic can be selected to be offloaded. Such rules may be used to trigger to initiate a secondary PDP context from a primary PDP context. The configured rules and trigger conditions may be implemented similar to those implemented within GGSN 205, such that the MDO device 215 can handle the rules in a similar way as GGSN 205 does. There may be multiple ways to configure MDO device 215 with the rules for secondary PDP context initiation. For example, such rules can be manually configured. Alternatively, they can be configured via a policy charging and rules function (PCRF) interface or other provisioning mechanisms that an operator uses to configure GGSN 205.

In one embodiment, GGSN 205 and/or operator service 208 is configured to detect that a different type of traffic is about to occur. Based on certain routing parameters (e.g., QoS parameters) or certain categories configured or set up in a configuration database of GGSN 205, GGSN 205 may initiate the creation of a secondary PDP context. Once MDO device 215 receives such an initiation from GGSN 205 via SGSN 204, MDO device 215 compares the required parameters extracted from the initiation messages against a set of one or more rules that have been configured within MDO device 215, where certain traffic with predetermined parameter or parameters may require offloading. For those offloading traffic, MDO device 215 changes the IP address of the secondary PDP context to its own IP address such that further traffic of the secondary PDP context can be directed to MDO device 215 instead of SGSN 204 and/or GGSN 205 of packet core network 206. For the ordinary traffic that does not require offloading, such traffic is still routed via the primary PDP context traversing SGSN 204 and/or GGSN 205 of packet core network.

Note that throughout this application, a 3G RAN and an RNC are used as an example of an access network and a gateway device. However, the present invention is not limited to use in network with these components. Other configurations may also be applied. For example, RAN 203 may be a femto cell while RNC 202 may be a femto gateway device.

Figure 3:
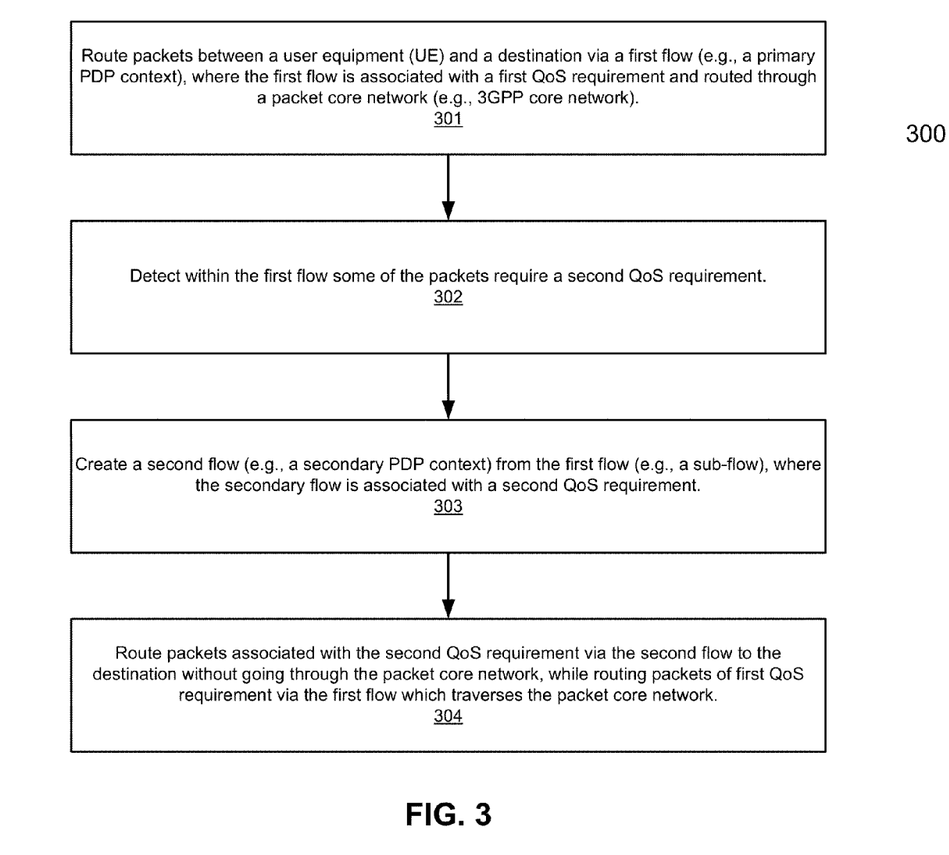
FIG. 3 is a flow diagram illustrating a process for routing data packets according to one embodiment of the invention.

FIG. 3 is a flow diagram illustrating a process for routing data packets according to one embodiment of the invention. Note that process 300 may be performed by processing logic which may include software, hardware, or a combination of both. For example, process 300 may be performed by MDO-GW 215 of FIG. 2. Referring to FIG. 3, at block 301, a first flow (e.g., a primary PDP context) is established to route packets between a UE and a destination in a session, where the first flow is associated with a first QoS requirement and is routed through a packet core network such as a 3GPP packet core network. During the first flow session, at block 302, it is detected that some of the packets of a different type require a second QoS requirement, which may be different than the first QoS requirement. Such detection may be performed via packet inspection and/or application layer signaling, etc. At block 303, a second flow (e.g., a secondary PDP context) is created from the first flow, where the second flow is associated with a second QoS requirement. At block 304, the packets associated with the second QoS requirement are routed via the second flow to the destination without going through the packet core network, while packets associated with the first QoS requirement are still routed via the first flow, traversing the packet core network. Note that a QoS requirement is used herein as an example to trigger creation of a second flow for the purpose of offloading the traffic from the packet core network. However, it is not so limited; other parameters or conditions may also be used to determine whether a second flow should be created and/or whether certain types of traffic should be offloaded.

Figure 4A:
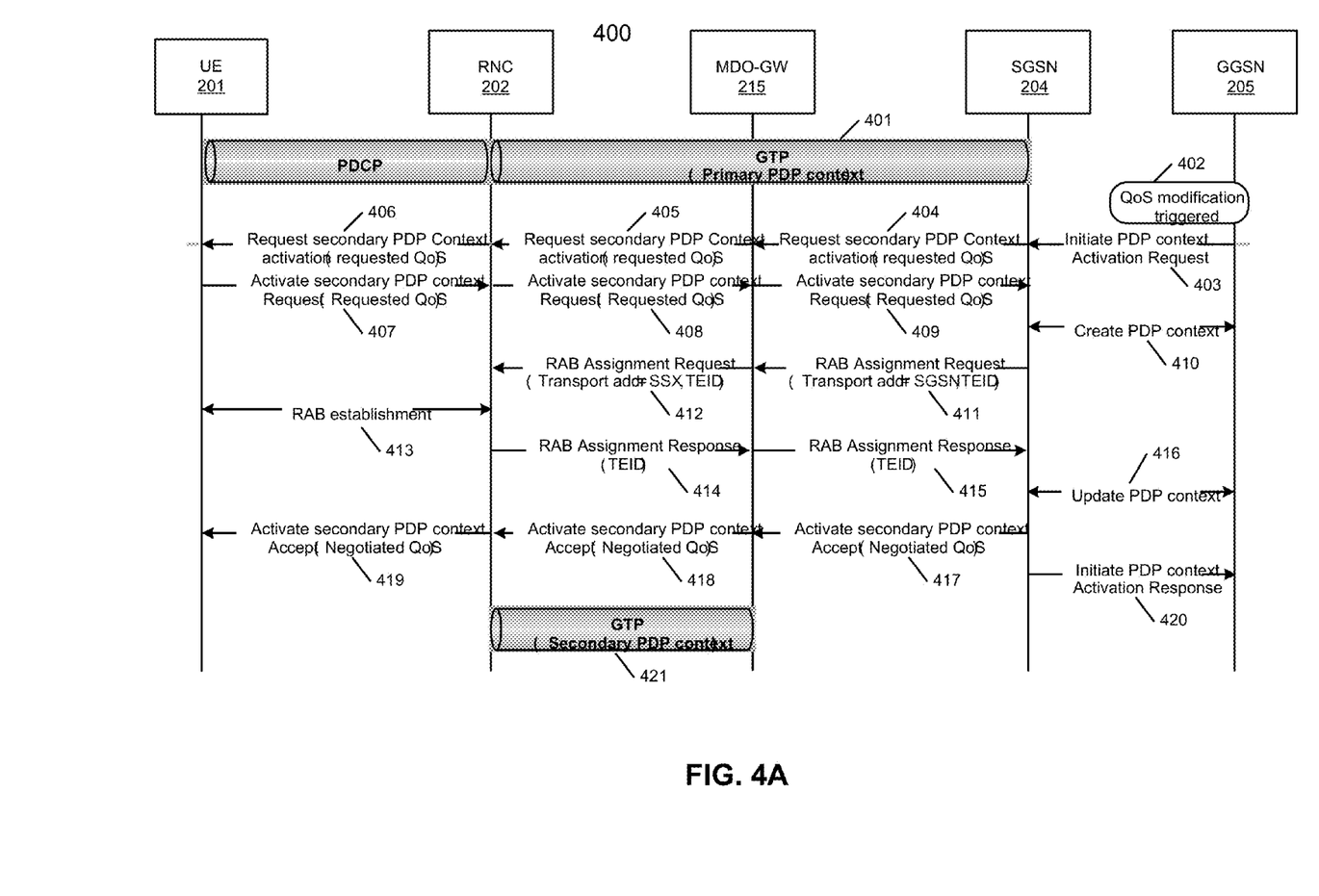
FIG. 4A is a transaction diagram illustrating a processing flow for handling data packets according to one embodiment of the invention.

FIG. 4A is a transaction diagram illustrating a processing flow for offloading traffic via a secondary PDP context according to one embodiment of the invention. For example, method 400 may be performed by system 200 of FIG. 2. Referring to FIG. 4A, initially a primary PDP context (e.g., a first flow or primary flow) is established and a GTP tunnel is created during transaction 401 to route non-offload traffic through a packet core network having SGSN 204 and GGSN 205. During the primary PDP context routing, at some point during transaction 402, one or more predetermined conditions or events occur. For example, when there is another type of traffic (e.g., streaming or file transport protocol), which may be detected via packet inspection and/or signaling, operator services or GGSN 205 may decide that this particular type of traffic needs to be treated differently. Alternatively, arrival of certain types of packets under certain condition (e.g., a real-time transport protocol or RTP packet arrives after successful a session initiation protocol or SIP interaction) may also be used as a trigger to create a secondary PDP context.

In response to the triggering event or condition, during transaction 403, GGSN 205 initiates a secondary PDP context (e.g., a second flow or secondary flow) activation by sending an Initiate PDP Context Activation Request message to SGSN 204. In response, SGSN 204 transmits a Request Secondary PDP Context Activation message to UE 201 via MDO-GW 215 and RNC 202 through transactions 404-406. The Request Secondary PDP Context Activation message contains a requested QoS parameter which may be determined by GGSN 205 based on certain configured rules or conditions. When MDO-GW 215 receives the Request Secondary PDP Context Activation message, it compares the QoS parameter extracted from the message with a set of one or more rules or conditions locally configured within MDO-GW 215 for the purpose of determining whether the traffic to be routed via the secondary PDP context should be offloaded bypassing the packet core network. If the QoS parameter matches the one configured locally that needs to be offloaded, MDO-GW 215 may record or mark down that subsequent traffic routed through the secondary PDP context should be offloaded bypassing the packet core network.

In response to the Request Secondary PDP Context Activation message, UE 201 initiates a secondary PDP context activation procedure by sending an Activate Secondary PDP Context Request message to RNC 202, MDO-GW 215, then to SGSN via transactions 407-409. During transaction 410, SGSN 204 and GGSN 205 perform the create PDP context procedure as defined in the 3GPP specification. SGSN 204 establishes a RAB (Radio Access Bearer) assignment for the secondary PDP context and transmits an RAB Assignment Request message to MDO-GW 215 via transaction 411. In the RAB Assignment Request message, the IP address was set to the IP address of SGSN 204. In response to the RAB Assignment Request message, if the traffic of the secondary PDP context is determined to be offloaded (e.g., determined during transactions 404-406), MDO-GW 215 replaces the IP address of SGSN with its own IP address. MDO-GW 215 then transmits the RAB Assignment Request message having the IP address of MDO-GW 215 to RNC 202 via transaction 412.

If the QoS has been changed by RNC 202, SGSN 204 updates GGSN 205 with new QoS information during transaction 416. SGSN 204 then sends an Activate Secondary PDP Context Accept message to UE 201 via transactions 417-419 traversing MDO-GW 215 and RNC 202. Meanwhile, SGSN 204 finishes the secondary PDP context activation procedure by sending an Initiate PDP Context Response to GGSN 205 via transaction 420. Thereafter, a GTP tunnel is established via transaction 421 between MDO-GW 215 and RNC 202 to carry the traffic for the secondary PDP context. As the IP address of UE 201 does not change for the secondary PDP context over the primary PDP context, MDO-GW 215 is configured to perform network address translation (NAT) operations for the secondary PDP context. As a result, the original traffic keeps flowing through SGSN 204 and GGSN 205 via the primary PDP context while other types of traffic (e.g., streaming or FTP) is offloaded at MDO-GW 215 using the secondary PDP context.

Figure 4B:
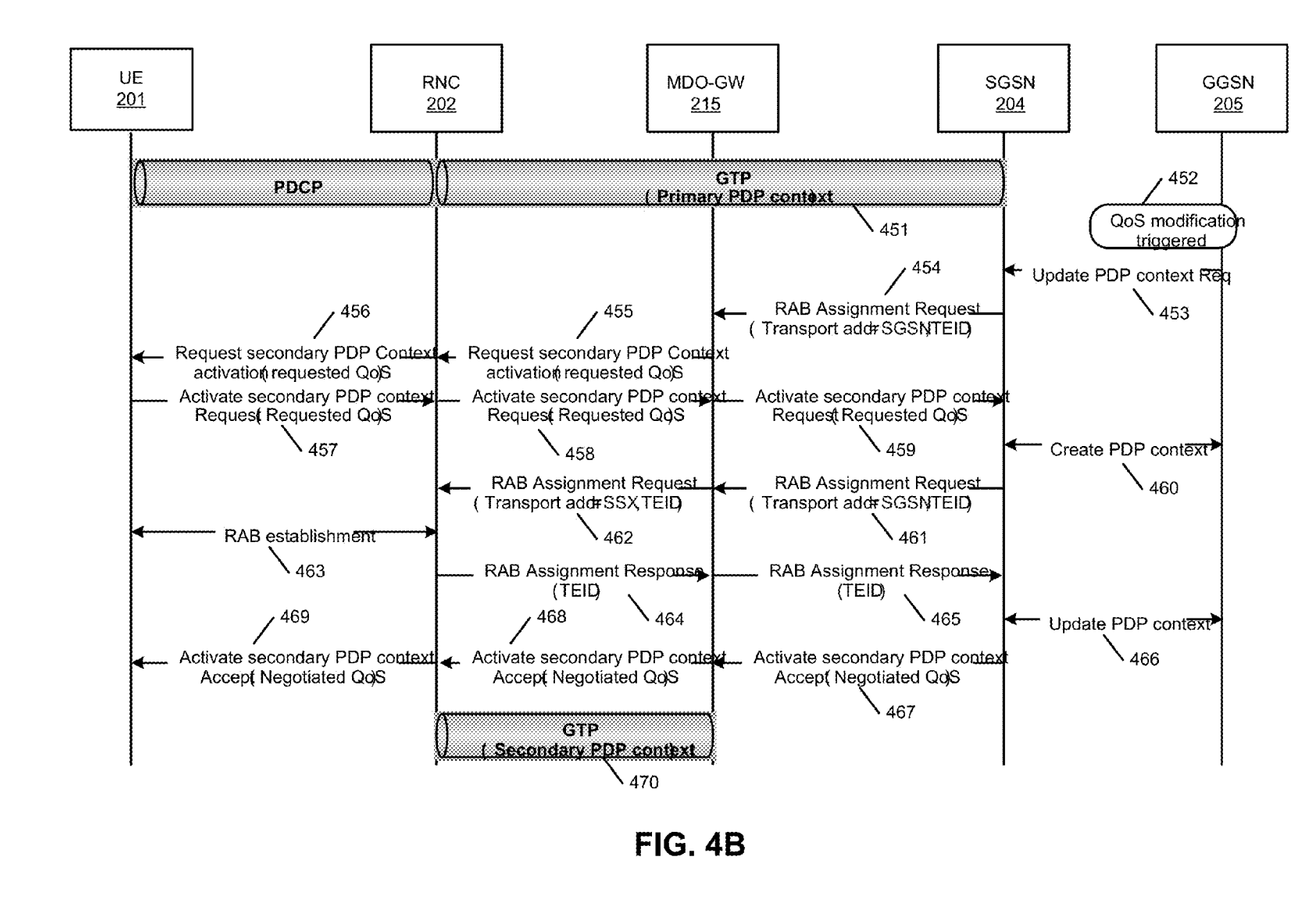
FIG. 4B is a transaction diagram illustrating a processing flow for handling data packets according to an alternative embodiment of the invention.

FIG. 4B is a transaction diagram illustrating a processing flow for offloading traffic via a secondary PDP context according to another embodiment of the invention. In this embodiment, the operator services may modify a QoS parameter or parameters rather than a creating secondary context, where a PDP context modification procedure is utilized. Referring to FIG. 4B, initially a primary PDP context (e.g., a first flow or primary flow) is established and a GTP tunnel is created during transaction 451 to route non-offload traffic through a packet core network having SGSN 204 and GGSN 205. During the primary PDP context routing, at some point during transaction 452, one or more predetermined conditions or events occur. For example, when there is another type of traffic (e.g., streaming, file transfer protocol or FTP), operator services or GGSN 205 may decide that this particular type of traffic needs to be treated differently. Alternatively, arrival of certain types of packets under certain condition (e.g., an RTP packet arrives after successful SIP interaction) may also be used as a trigger to create a secondary PDP context.

In response to the triggering event or condition, during transaction 453, GGSN 205 initiates a PDP context modification procedure by sending an Update PDP Context Request message to SGSN 204. In response, during transaction 454, SGSN 204 transmits a RAB Assignment Request message to MDO-GW 215, where the RAB Assignment Request message includes a modified QoS parameter. When MDO-GW 215 receives the RAB Assignment Request message, it compares the QoS parameter extracted from the message with a set of one or more rules or conditions locally configured within MDO-GW 215 for the purpose of determining whether the traffic to be routed via the secondary PDP context (e.g., a second flow or secondary flow) should be offloaded bypassing the packet core network. If the QoS parameter matches the one configured locally that needs to be offloaded, MDO-GW 215 may record or mark down that subsequent traffic routed through the secondary PDP context should be offloaded bypassing the packet core network. MDO-GW 215 then initiates a secondary PDP context activation procedure by sending a Request Secondary PDP Context Activation Request message to RNC 202 and UE 201 via transactions 455-456.

In response to the Request Secondary PDP Context Activation message, UE 201 initiates a secondary PDP context activation procedure by sending an Activate Secondary PDP Context Request message to RNC 202, MDO-GW 215, then to SGSN via transactions 457-459. During transaction 460, SGSN 204 and GGSN 205 perform the create PDP context procedure as defined in the 3GPP specification. SGSN 204 establishes a RAB assignment for the secondary PDP context and transmits an RAB Assignment Request message to MDO-GW 215 via transaction 461. In the RAB Assignment Request message, the IP address was set to the IP address of SGSN 204. In response to the RAB Assignment Request message, if the traffic of the secondary PDP context is determined to be offloaded (e.g., determined during transaction 454), MDO-GW 215 replaces the IP address of SGSN with its own IP address. MDO-GW 215 then transmits the RAB Assignment Request message having the IP address of MDO-GW 215 to RNC 202 via transaction 462. The RAB establishment is completed by RNC 202 and UE 201 during transaction 463. Meanwhile, RNC 202 transmits a RAB Assignment Response message to SGSN 204 via transactions 464-465.

If the QoS has been changed by RNC 202, SGSN 204 updates GGSN 205 with new QoS information during transaction 466. SGSN 204 then sends an Activate Secondary PDP Context Accept message to UE 201 via transactions 467-469 traversing MDO-GW 215 and RNC 202. Thereafter, a GTP tunnel is established via transaction 470 between MDO-GW 215 and RNC 202 to carry the traffic for the secondary PDP context. As the IP address of UE 201 does not change for the secondary PDP context over the primary PDP context, MDO-GW 215 is configured to perform network address translation (NAT) operations for the secondary PDP context. As a result, the original traffic keeps flowing through SGSN 204 and GGSN 205 via the primary PDP context while other types of traffic (e.g., streaming or FTP) are offloaded at MDO-GW 215 using the secondary PDP context.

Thus, with the MDO-GW's capability to identify certain types of traffic as offload traffic and initiating a secondary PDP context for the offload traffic, it is possible to selectively offload certain traffic within a user session based on the traffic type. It is useful to note that the MDO-GW does not sit in the user plane path between an RNC and SGSN for the non-offload traffic. It does not monitor the non-offload user traffic with packet inspection. The MDO-GW only monitors the control signaling between the RNC and SGSN to decide whether a secondary PDP context is needed and the associated traffic should be offloaded. After the secondary PDP context is created, the narrowband traffic (e.g., Web browsing) may still be served by the SGSN and GGSN while the broadband traffic (e.g., streaming or bulk FTP) is offloaded at the MDO-GW via the secondary PDP context.

Figure 5:
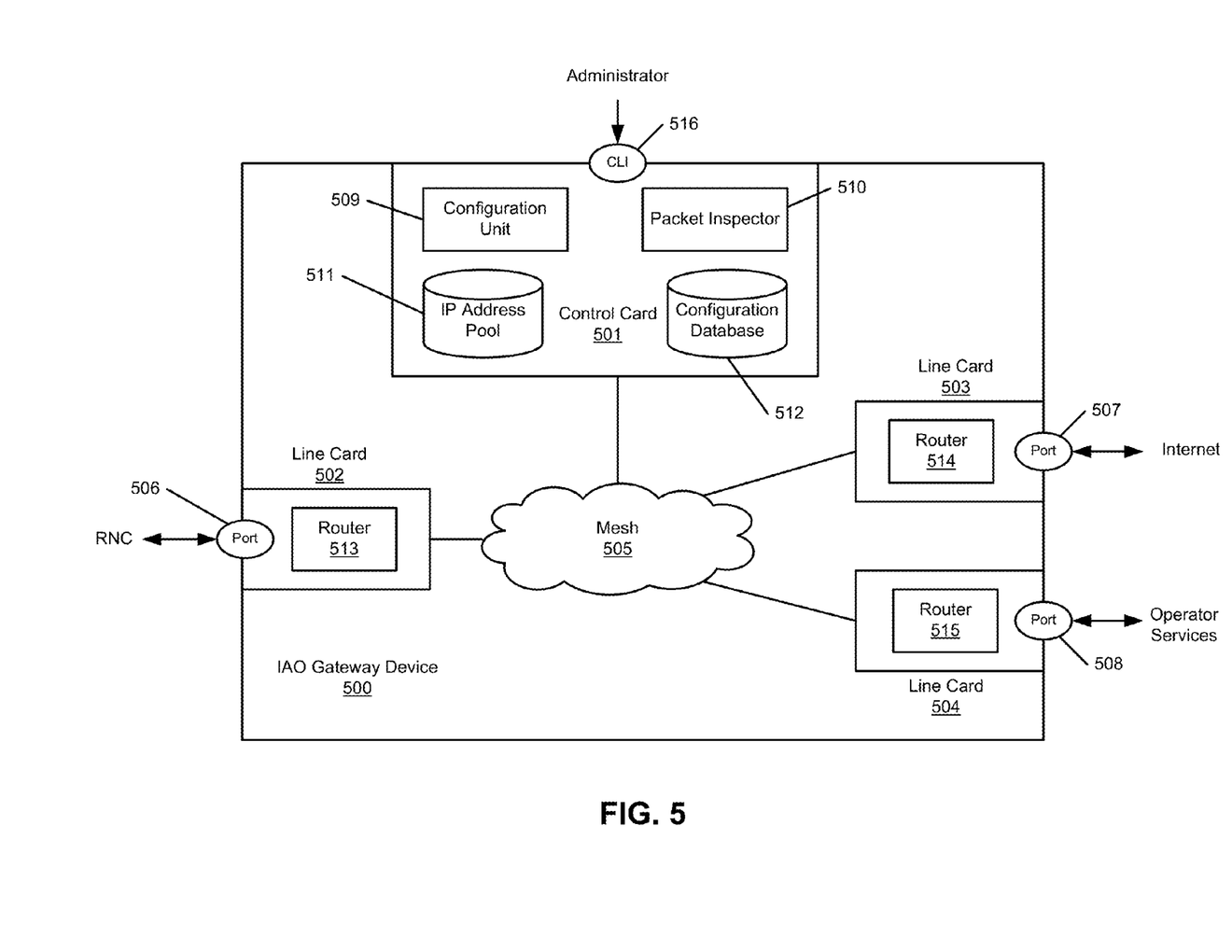
FIG. 5 is a block diagram illustrating a network element according to one embodiment of the invention.

FIG. 5 is a block diagram illustrating an MDO-GW according to one embodiment of the invention. For example, MDO-GW 500 may be implemented as a part of MDO-GW 215 of FIG. 2. Referring to FIG. 5, MDO-GW 500 includes, but is not limited to, a control card 501 (also referred to as a control plane) communicatively coupled to one or more line cards 502-504 (also referred to as interface cards or user planes) over a mesh 505, which may be a mesh network, an interconnect, a bus, or a combination thereof. Each of the line cards 503-504 is associated with one or more interfaces (also referred to as ports), such as interfaces 506-508 respectively. Each line card includes routing functional block (e.g., blocks 513-515) to route packets via the corresponding interface according to a configuration (e.g., routing table) configured by control card 501. For the purpose of illustration, it is assumed that interface 506 is to be coupled to an RNC of a RAN; interface 507 is to be coupled to the Internet; and interface 508 is to be coupled to SGSN of a 3GPP packet core network for operator services.

According to one embodiment, control card 501 includes configuration unit 509, packet inspector 510, IP address pool database 511, and configuration database 512. In one embodiment, database 512 is used to store information regarding which QoS requirements or other parameters of which the traffic should be diverted to the Internet directly bypassing the 3GPP packet core network. As described above, an administrator can configure or specify via a user interface (e.g. command line interface (CLI)) 516 which QoS requirements or other parameters for the purpose of Internet breakout. Through user interface 516, the administrator can also enable and/or disable a specific QoS requirement or other parameters for Internet breakout purposes.

Packet inspector 510 is configured to inspect session initiation request control packets to establish a connection to determine whether the traffic is to be Internet bound by comparing certain parameters such as QoS parameters provided in the request and the corresponding ones stored/configured in database 512. If so, the configuration unit 509 may perform a process similar to the one as shown in FIGS. 4A-4B, including replacing certain IP addresses from its own IP address pool 511. Based on the configuration set up by control card 501, a packet router functional block of each line card is configured to route the corresponding data packets to the Internet directly, for example, via interface 507, bypassing the 3GPP packet core network. Otherwise, if configuration unit 509 determines that a packet is destined for the 3GPP packet core network, the packet router would route the packet to the 3GPP packet core network, for example, via interface 508.

Note that some of the functionality of control card 501 may be delegated or replicated to a line card. For example, certain information of database 512 may be replicated to line cards 502-504 and stored in a storage location (not shown) within line cards 502-504. Also note that some or all of the components as shown in FIG. 5 may be implemented in hardware, software, or a combination of both.

The solution described above requires only the transport path and the MDO-GW to be configured; other nodes are entirely unaffected. The solution only applies to the APNs that an operator decides to breakout. That is, a specific APN can be specifically enabled or disabled within the MDO-GW by changing the IAO configuration. All other APNs and services are completely unaffected with respect to mobility, charging, and roaming, etc. No change is needed in operations, packet core nodes, routing or user experience (e.g., transparent). The solution described herein can work with any mobile packet core. For APNs that are configured for breakout, most of the user experience and operations remain the same. Most of the mechanisms used in the solution described herein are already standardized by 3GPP. There is no threat to the existing 3GPP mobile network architecture and operations.

The solution described herein also fully supports mobility as it is supported today in 3GPP operator network. The RNC or SGSN, depending on the type of mobility, keeps acting as the control anchor for the mobility, and the mobility is supported transparently to the MDO-GW without any impact to the operators' network.

In addition, outbound roaming is completely unaffected by the solution described herein, since only APNs configured at the MDO-GW are subjected to local breakout. With respect to inbound roaming, if the operator does not want the breakout for in-roamers, roaming APN is not configured at the MDO-GW. Traffic is handled at SGSN as per 3GPP specification and there is no impact on user experience or network operations. If the operator wants local breakout for in-roamers, the corresponding roaming APN is configured within the MDO-GW. The MDO-GW provides local breakout for this APN for the in-roamers. Charging is carried out as per 3GPP roaming practice.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for processing network traffic of a packet network, the method comprising:
   routing, by a mobile data offload (MDO) device, packets of a first type within a first flow received from via a radio network controller (RNC) of a radio access network (RAN) and originated from a user equipment (UE) to a destination through a packet core network, wherein the MDO device is located between the RNC and a serving general packer radio service (GPRS) support node (SGSN) of the packet core network;
   in response to a detection that packets of a second type are to be routed while routing the first flow, creating, by the MDO, a second flow which is a sub-flow of the first flow, wherein the first flow and the second flow are associated with the same UE, wherein the first flow is realized as a primary packet data protocol (PDP) context and the second flow is realized as a secondary PDP context, wherein the first flow includes control packets to be serviced by an operator service of the packet core network and the second flow includes data packets to be routed to the destination over the Internet without going through the SGSN of the packet core network, wherein creating the secondary PDP context comprises:
   receiving, at the MDO device, a Radio Access Bearer (RAB) Assignment Request message for the secondary PDP context from the SGSN of the packet core network,
   replacing a transport layer address of the RAB Assignment Request message from an IP address of the SGSN with an IP address of the MDO device, and
   transmitting the RAB Assignment Request message having the IP address of the MDO device to the RNC to complete an RAB assignment for the UE; and
   routing, by the MDO, packets of the second type via the second flow of the UE to the destination without routing to the SGSN of the packet core network, while continue to route packets of the first type via the first flow of the UE traversing the packet core network.

2. The method of claim 1 wherein the first type of packets is associated with a first quality of service (QoS) requirement and the second type of packets is associated with a second QoS requirement that is different than the first QoS requirement.

3. The method of claim 1 further comprising establishing a GPRS tunneling protocol (GTP) tunnel between the RNC and the MDO device for the secondary PDP context, such that data exchanged through the GTP tunnel is directly routed to the destination by the MDO device without going through the SGSN of the packet core network.

4. The method of claim 1, further comprising:
   prior to receiving the RAB Assignment Request message, receiving a Request Secondary PDP Context Activation message from the SGSN in response to the SGSN receiving an Initiate PDP Context Activation Request message from the GGSN of the packet core network, which is in response to the detection of packets of the second type; and
   examining a QoS parameter of the Request Secondary PDP Context Activation message in view of a set of one or more rules controlling operations of the MDO device in order to determine whether packets of the second type should be routed to the destination which bypassing the packet core network.

5. The method of claim 1, further comprising:
   receiving a second RAB Assignment Request message from the SGSN which receives an Update PDP Context Request message from GGSN in response to the detection, the second RAB Assignment Request message indicating a change of a QoS parameter;
   in response to the second RAB Assignment Request message, transmitting a Request Secondary PDP Context Activation message to the UE via the RNC;
   receiving an Activate Secondary PDP Context Request message from the UE via the RNC; forwarding the Activate Secondary PDP Context Request message to the SGSN to complete creation of the secondary PDP context;
   receiving an Activate Secondary PDP Context Accept message from the SGSN; and
   forwarding the Activate Secondary PDP Context Accept message to the UE via the RNC to complete creation of the GTP tunnel.

6. A non-transitory machine-readable storage medium storing instructions therein, which when executed by a processor, cause the processor to perform a method for processing network traffic of a data network, the method comprising:
   routing, by a mobile data offload (MDO) device, packets of a first type within a first flow received from via a radio network controller (RNC) of a radio access network (RAN) and originated from a user equipment (UE) to a destination through a packet core network, wherein the MDO device is located between the RNC and a serving general packer radio service (GPRS) support node (SGSN) of the packet core network;
   in response to a detection that packets of a second type are to be routed while routing the first flow, creating, by the MDO, a second flow which is a sub-flow of the first flow, wherein the first flow and the second flow are associated with the same UE, wherein the first flow is realized as a primary packet data protocol (PDP) context and the second flow is realized as a secondary PDP context, wherein the first flow includes control packets to be serviced by an operator service of the packet core network and the second flow includes data packets to be routed to the destination over the Internet without going through the SGSN of the packet core network, wherein creating the secondary PDP context comprises:

receiving, at the MDO device, a Radio Access Bearer (RAB) Assignment Request message for the secondary PDP context from the SGSN of the packet core network, replacing a transport layer address of the RAB Assignment Request message from an IP address of the SGSN with an IP address of the MDO device, and transmitting the RAB Assignment Request message having the IP address of the MDO device to the RNC to complete an RAB assignment for the UE; and routing, by the MDO, packets of the second type via the second flow to the destination without routing to the SGSN of the packet core network, while continue to route packets of the first type via the first flow traversing the packet core network.

7. The non-transitory machine-readable storage medium of claim 6, wherein the first type of packets is associated with a first quality of service (QoS) requirement and the second type of packets is associated with a second QoS requirement that is different than the first QoS requirement.

8. The non-transitory machine-readable storage medium of claim claim 6, wherein the method further comprises establishing a GPRS tunneling protocol (GTP) tunnel between the RNC and the MDO device for the secondary PDP context, such that data exchanged through the GTP tunnel is directly routed to the destination by the MDO device without going through the SGSN of the packet core network.

9. The non-transitory machine-readable storage medium of claim 6, wherein the method further comprises:

prior to receiving the RAB Assignment Request message, receiving a Request Secondary PDP Context Activation message from the SGSN in response to the SGSN receiving an Initiate PDP Context Activation Request message from the GGSN of the packet core network, which is in response to the detection of packets of the second type; and examining a QoS parameter of the Request Secondary PDP Context Activation message in view of a set of one or more rules controlling operations of the MDO device in order to determine whether packets of the second type should be routed to the destination which bypassing the packet core network.

10. The non-transitory machine-readable storage medium of claim 6, wherein the method further comprises:

receiving a second RAB Assignment Request message from the SGSN which receives an Update PDP Context Request message from GGSN in response to the detection, the second RAB Assignment Request message indicating a change of a QoS parameter;

in response to the second RAB Assignment Request message, transmitting a Request Secondary PDP Context Activation message to the UE via the RNC;

receiving an Activate Secondary PDP Context Request message from the UE via the RNC;

forwarding the Activate Secondary PDP Context Request message to the SGSN to complete creation of the secondary PDP context;

receiving an Activate Secondary PDP Context Accept message from the SGSN; and forwarding the Activate Secondary PDP Context Accept message to the UE via the RNC to complete creation of the GTP tunnel.

11. A network element, comprising:

a router to route packets of a first type within a first flow to a destination through a packet core network, wherein the packets of the first flow is received from a radio network controller (RNC) of a radio access network (RAN) and originated from a user equipment (UE), and wherein the network element is a mobile data offload (MDO) device located between the RNC and a serving general packer radio service (GPRS) support node (SGSN) of the packet core network; and a packet inspector, in response to a detection that packets of a second type are to be routed while routing the first flow, to create a second flow which is a sub-flow of the first flow, wherein the first flow and the second flow are associated with the same UE, wherein the first flow is realized as a primary packet data protocol (PDP) context and the second flow is realized as a secondary PDP context, wherein the first flow includes control packets to be serviced by an operator service of the packet core network and the second flow includes data packets to be routed to the destination over the Internet without going through the SGSN of the packet core network, wherein creating the secondary PDP context comprises:

receiving a Radio Access Bearer (RAB) Assignment Request message for the secondary PDP context from the SGSN of the packet core network, replacing a transport layer address of the RAB Assignment Request message from an IP address of the SGSN with an IP address of the network element, and transmitting the RAB Assignment Request message having the IP address of the network element to the RNC to complete an RAB assignment for the UE, wherein the router is configured to route packets of the second type via the second flow to the destination without routing to the SGSN of the packet core network, while continue to route packets of the first type via the first flow traversing the packet core network.

12. The network element of claim 11, wherein the first type of packets is associated with a first quality of service (QoS) requirement and the second type of packets is associated with a second QoS requirement that is different than the first QoS requirement.

* * * * *